Dec. 23, 1930.　　　　　E. SWICK　　　　　1,786,093

TOWING HITCH

Filed March 28, 1930

Inventor

*Elda Swick*

By *Clarence A. O'Brien*
　　　　　　*Attorney*

Patented Dec. 23, 1930

1,786,093

UNITED STATES PATENT OFFICE

ELDA SWICK, OF CLINTON, NEBRASKA

TOWING HITCH

Application filed March 28, 1930. Serial No. 439,658.

This invention relates to new and useful improvements in towing hitches and more particularly to devices of this character which are adapted to be used in connection with automobiles.

A primary object of the invention is to provide, in a manner as hereinafter set forth, a towing hitch of the aforementioned character which may be expeditiously and securely mounted in position on the front axle of an automobile without the necessity of altering the same structurally in any manner.

Another important object of the invention is to provide a towing hitch embodying a pair of coupling brackets which are adapted to be permanently mounted on the front axle of the vehicle to detachably receive a draw bar which constitutes a part of the invention.

Other objects of the invention are to provide a towing hitch of the character set forth which will be simple in construction, strong, durable, efficient in its use and which may be manufactured at low cost.

All of the foregoing and still further objects and advantages of the invention may become apparent from a study of the following specification, taken in connection with the accompanying drawings wherein like characters of reference designate corresponding parts throughout the several views, and wherein:—

Figure 1:
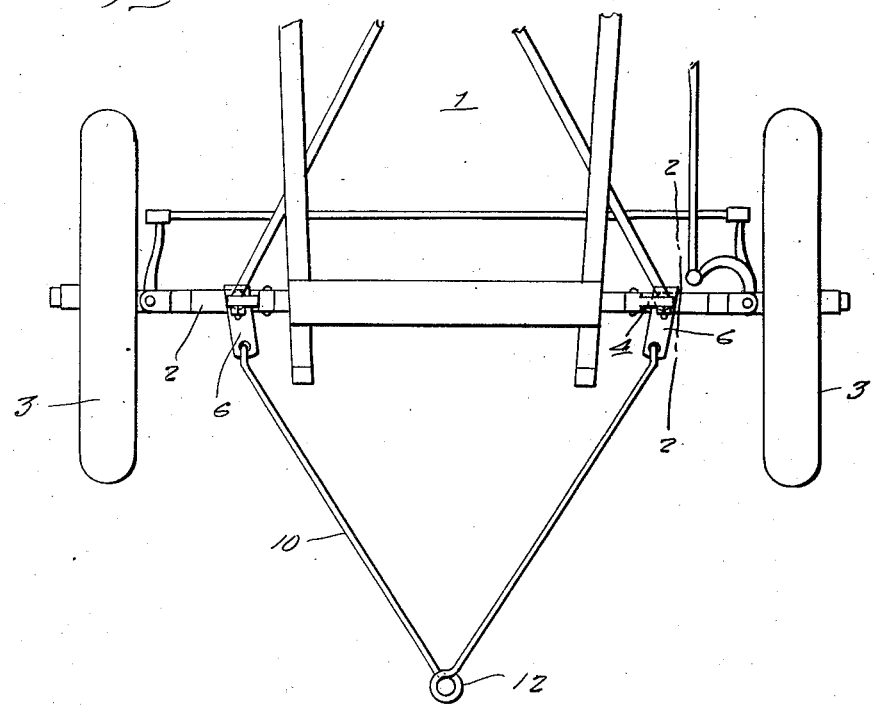
Figure 1 is a view in top plan of a towing hitch constructed in accordance with this invention operatively connected to a vehicle.

Referring to the drawings in detail, it will be seen that the reference numeral 1 designates generally the chassis of an automobile, the forward portion only being shown, said chassis being mounted on the front axle 2 having a steering wheel 3 thereon. The reference numeral 4 indicates a pair of conventional spring perches which are disposed in upstanding position in longitudinally spaced relation on the axle 2 and adapted to receive the opposite end of a transverse spring (not shown) for supporting chassis 1. The opposite ends of the radius rod 5 are also mounted in the perches 4. All of the elements described thus far are conventional on the model A Ford automobile and constitutes no part of this invention.

Figure 2:
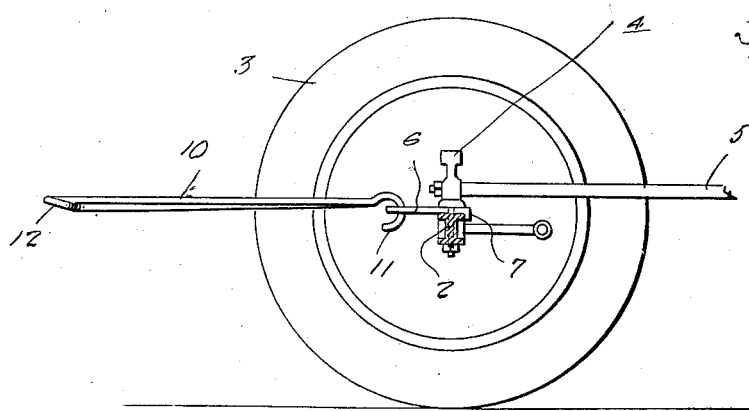
Figure 2 is a cross section through the axle taken substantially on the line 2—2 of Figure 1 and showing the towing hitch in side elevation mounted in position thereon.
Figure 3:
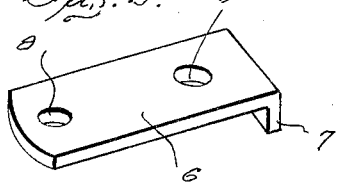
Figure 3 is a detail view in perspective of one of the coupling brackets.

The device comprising this invention includes a pair of elongated, flat metallic coupling brackets 6 having an integral down turned lip 7 on their rear ends and longitudinally spaced front and rear openings 8 and 9 respectively. The coupling brackets 6 are adapted to be mounted transversely across the top of the axle 2 in such a manner that the lip 7 will abut the rear side of said axle and the threaded shank of each of the perches 4 is passed vertically through the rear opening 9 and secured in the usual manner, thus rigidly anchoring the brackets in spaced relation on the axle, as clearly illustrated in Figures 1 and 2 of the drawings. As illustrated to advantage in Figure 1 of the drawings, the lip 7 is disposed at an obtuse angle with respect to the body portion of the bracket in order that this bracket will converge slightly when mounted in position on the axle.

A substantially V-shaped draw bar 10 is formed at its free end portion with open hooks 11 for engagement through the forward openings 8 in the brackets 6 and said draw bar has its intermediate portion looped to form a coupling eye 12 for connecting the same to a draft vehicle (not shown). As clearly seen in the drawings, the draw bar 10 is formed of a single piece of material and the arrangement of the hooks 11 permit the same to be expeditiously connected to or detached from the bracket 6.

To install the device on the axle 2, it is only necessary to detach the spring perches 4 and elevate the same in a manner to permit the brackets 6 to be properly positioned after which the threaded shank of the perches is inserted through the openings 9 in the bracket and through the openings provided therefor in said axle 2. When the usual nut is secured to the perches on the lower side of the axle, said perches and the brackets are anchored in position and the integral lip 7 serve to further strengthen the brackets in a manner to resist forward pull thereon.

The brackets 6 may be, if desired, left permanently on the automobile while the draw bar 10 is easily attached thereto and removed therefrom, as before stated. It will thus be seen that I have provided a towing hitch which is of extremely simple construction, but which possesses great strength and durability and furthermore which does not require alteration of the vehicle in order to be installed in operative position thereon.

It is believed that the many advantages of a towing hitch constructed in accordance with this invention will be readily understood, and although the preferred embodiment of the invention is as illustrated and described, it is to be understood that changes in the details of construction may be had which will fall within the scope of the invention as claimed.

What is claimed is:—

A towing hitch of the character described comprising a pair of coupling brackets adapted for disposition across a vehicle axle between the spring perches mounted thereon and said axle and in a manner to project forwardly therefrom in converging relation to each other, said brackets having openings in their end portions for the passage of the perch bolts, integral down turned lips formed on the rear ends of the brackets for abutting engagement with the rear side of the axle, said lips disposed diagonally with respect to the brackets, the brackets being further provided with openings in their forward end portions, a substantially V-shaped draw bar, integral hooks on the opposite ends of the draw bar for detachable engagement through the openings in the forward portions of the brackets for detachably securing the draw bar thereto, and an integral loop bent upon itself and formed on the intermediate portion of the draw bar constituting means for connecting the same to a draft vehicle.

In testimony whereof I affix my signature.

ELDA SWICK.